(12) United States Patent
Batchelder

(10) Patent No.: US 8,215,371 B2
(45) Date of Patent: Jul. 10, 2012

(54) DIGITAL MANUFACTURING WITH AMORPHOUS METALLIC ALLOYS

(75) Inventor: John Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 181 days.

(21) Appl. No.: 12/417,740

(22) Filed: Apr. 3, 2009

(65) Prior Publication Data

US 2009/0263582 A1 Oct. 22, 2009

Related U.S. Application Data

(60) Provisional application No. 61/124,646, filed on Apr. 18, 2008.

(51) Int. Cl.
*B22D 46/00* (2006.01)
(52) U.S. Cl. ............... 164/4.1; 164/155.1; 164/155.4
(58) Field of Classification Search .............. 164/4.1, 164/155.1, 155.4
See application file for complete search history.

(56) References Cited

U.S. PATENT DOCUMENTS

| | | | |
|---|---|---|---|
| 5,109,589 A | 5/1992 | Cramer et al. | |
| 5,121,329 A * | 6/1992 | Crump ..................... | 700/119 |
| 5,312,224 A | 5/1994 | Batchelder et al. | |
| 5,340,433 A | 8/1994 | Crump | |
| 5,503,785 A | 4/1996 | Crump et al. | |
| 5,622,216 A | 4/1997 | Brown | |
| 5,764,521 A | 6/1998 | Batchelder et al. | |
| 5,816,466 A | 10/1998 | Seufer | |
| 5,866,058 A | 2/1999 | Batchelder et al. | |
| 6,022,207 A | 2/2000 | Dahlin et al. | |
| 6,054,077 A | 4/2000 | Comb et al. | |
| 6,085,957 A | 7/2000 | Zinniel et al. | |
| 6,257,517 B1 | 7/2001 | Babish et al. | |
| 6,547,995 B1 | 4/2003 | Comb | |
| 6,722,872 B1 | 4/2004 | Swanson et al. | |
| 6,814,907 B1 | 11/2004 | Comb | |
| 6,923,634 B2 | 8/2005 | Swanson et al. | |
| 7,026,574 B2 | 4/2006 | Belfiore et al. | |
| 7,122,246 B2 | 10/2006 | Comb et al. | |
| 2007/0003656 A1 | 1/2007 | LaBossiere et al. | |
| 2007/0228590 A1 | 10/2007 | LaBossiere et al. | |
| 2008/0213419 A1 | 9/2008 | Skubic et al. | |
| 2009/0035405 A1 | 2/2009 | Leavitt | |

OTHER PUBLICATIONS

Zhang, B., Zhao, D.Q., Pan M.X., Wang, W.H, Greer, A.L.., "Amorphous Metallic Plastic", Physical Review Letters, published May 23, 2005, (4 pages) PRL 94, 205502 (2005), The American Physical Society College Park, MD, USA.

Murthy, N.S., Minor H., Akkapeddi, M.K., Van Buskirk, B., "Characterization of Polymer Blends and Alloys be Constrained Profile-Analysis of X-Ray Diffraction Scans", accepted Jan. 2, 1990, (8 pages), Journal of Applied Polymer Science, vol. 41, 2265-2272 (1990), John Wiley & Sons, Inc., USA.

Jan Schroers et al., "Thermoplastic blow molding of metals", Materials Today, Jan.-Feb. 2011, vol. 14, pp. 14-19.

* cited by examiner

*Primary Examiner* — Kuang Lin
(74) *Attorney, Agent, or Firm* — Brian R. Morrison; Westman, Champlin & Kelly, P.A.

(57) ABSTRACT

A method for building a three-dimensional object in a layer-by-layer manner, the method comprising heating a build chamber of a digital manufacturing system, feeding a solid feedstock of a modeling material comprising an amorphous metallic alloy to a liquefier assembly of the digital manufacturing system, heating the modeling material of the solid feedstock in the liquefier assembly to an extrudable state, and depositing the heated modeling material within the heated build chamber in a predetermined pattern to form the three-dimensional object.

14 Claims, 2 Drawing Sheets

US 8,215,371 B2

DIGITAL MANUFACTURING WITH AMORPHOUS METALLIC ALLOYS

CROSS-REFERENCE TO RELATED APPLICATION(S)

The present application claims priority to U.S. Provisional Application No. 61/124,646, filed on Apr. 18, 2008, and entitled "DIGITAL MANUFACTURING WITH AMORPHOUS METALLIC ALLOYS", the disclosure of which is incorporated by reference in its entirety.

BACKGROUND

The present invention relates to methods for building three-dimensional (3D) objects in extrusion-based digital manufacturing systems. In particular, the present invention relates to metallic modeling materials for use in extrusion-based digital manufacturing systems.

An extrusion-based digital manufacturing system (e.g., fused deposition modeling systems developed by Stratasys, Inc., Eden Prairie, Minn.) is used to build a 3D object from a computer-aided design (CAD) model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D object resembling the CAD model.

Movement of the extrusion head with respect to the substrate is performed under computer control, in accordance with build data that represents the 3D object. The build data is obtained by initially slicing the CAD model of the 3D object into multiple horizontally sliced layers. Then, for each sliced layer, the host computer generates a build path for depositing roads of modeling material to form the 3D object.

In fabricating 3D objects by depositing layers of modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D object being formed. Support material is then deposited from a second nozzle pursuant to the generated geometry during the build process. The support material adheres to the modeling material during fabrication, and is removable from the completed 3D object when the build process is complete.

A common interest of consumers in the industry of digital manufacturing is to increase the physical properties of the 3D objects, such as part strengths and durability. One category of materials that could provide such increased physical properties include metallic materials. For example, 3D objects built from steel may exhibit tensile strengths of about 480 megapascals (about 70,000 pounds/square-inch), which is substantially greater than those of industrial thermoplastic materials (e.g., about 30 megapascals (5,000 pounds/square-inch) for acrylonitrile-butadiene-styrene materials). However, the extrusion of metallic materials poses several issues for digital manufacturing. First, the extrusion of metallic materials require high operating temperatures, which may undesirably affect performance of the digital manufacturing systems. Furthermore, metallic materials typically exhibit substantial crystalline atomic-scale structures, which exhibit slushy states between their solidus and liquidus phases (for non-eutectic alloys) that may clog nozzles of the extrusion head. Thus, there is an ongoing need for materials that exhibit good physical properties and that are extrudable for use with digital manufacturing systems.

SUMMARY

The present invention relates to a method for building a three-dimensional object in a layer-by-layer manner with a digital manufacturing system. The method includes heating a build chamber of the digital manufacturing system, and feeding a solid feedstock of a modeling material to a liquefier assembly of the digital manufacturing system, where the modeling material comprises an amorphous metallic alloy. The method further includes heating the modeling material of the solid feedstock in the liquefier assembly to an extrudable state, and depositing the heated modeling material within the heated build chamber in a predetermined pattern to form the three-dimensional object.

DETAILED DESCRIPTION

Figure 1:
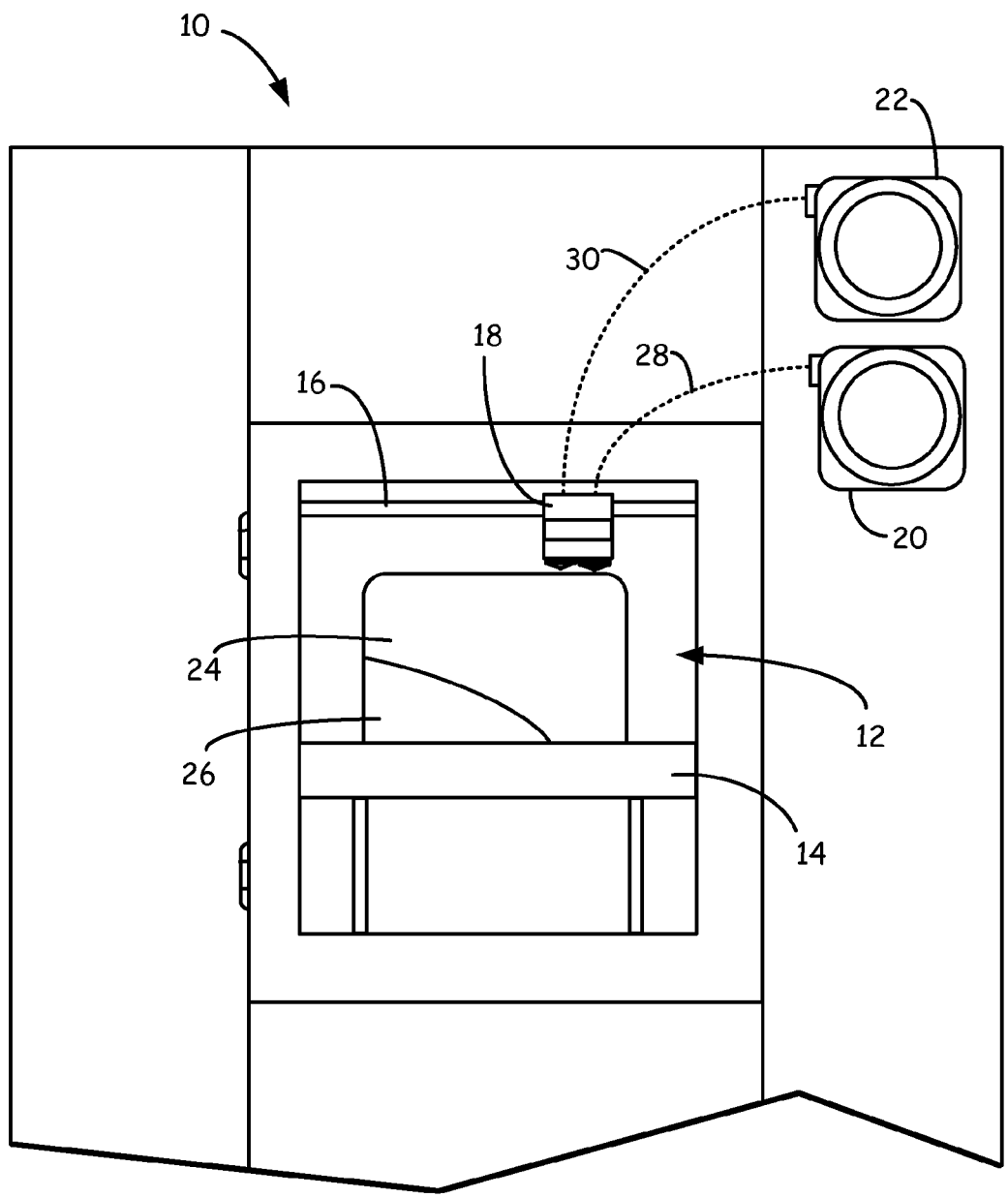
FIG. 1 is a front view of an extrusion-based digital manufacturing system for building 3D objects from amorphous metallic alloys.
Figure 1:
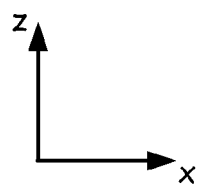

FIG. 1 is a front view of system 10, which is an extrusion-based digital manufacturing system that includes build chamber 12, build platform 14, gantry 16, extrusion head 18, wire supply source 20, and filament supply source 22. Suitable digital manufacturing systems for system 10 include fused deposition modeling systems developed by Stratasys, Inc., Eden Prairie, Minn. Build chamber 12 is an enclosed environment that contains build platform 14, gantry 16, and extrusion head 18 for building a 3D object (referred to as 3D object 24) and a corresponding support structure (referred to as support structure 26). As discussed below, 3D object 24 is built from a modeling material that includes an amorphous metallic alloy. This provides 3D object 24 good physical properties due to the amorphous metallic alloy (e.g., high part strengths, durability, and corrosion resistance).

Build platform 14 is a substrate on which 3D object 24 and support structure 26 are built, and moves along a vertical z-axis based on signals provided from a computer-operated controller (not shown). Gantry 16 is a guide rail system configured to move extrusion head 18 in a horizontal x-y plane within build chamber 12 based on signals provided from the computer-operated controller. The horizontal x-y plane is a plane defined by an x-axis and a y-axis (not shown in FIG. 1), where the x-axis, the y-axis, and the z-axis are orthogonal to each other. In an alternative embodiment, build platform 14 may be configured to move in the horizontal x-y plane within build chamber 12, and extrusion head 18 may be configured to move along the z-axis. Other similar arrangements may also be used such that one or both of build platform 14 and extrusion head 18 are moveable relative to each other.

Extrusion head 18 is a moveable deposition head supported by gantry 16 for building 3D object 24 and support structure 26 on build platform 14 in a layer-by-layer manner, based on signals provided from the computer-operated controller. In the embodiment shown in FIG. 1, extrusion head 18 is a dual-tip extrusion head configured to deposit modeling and support materials from wire 28 and filament 30, respectively. Examples of suitable extrusion heads for extrusion head 18 include those disclosed in LaBossiere, et al., U.S. Patent Application Publication No. 2007/0003656, entitled "Rapid Prototyping System With Controlled Material Feedstock"; LaBossiere, et al., U.S. Patent Application Publication No. 2007/0228590, entitled "Single-Motor Extrusion Head Having Multiple Extrusion Lines"; and Leavitt, U.S. Patent Application Publication No. 2009/0035405, entitled "Extrusion Head For Use In Extrusion-Based Layered Deposition System".

Wire supply source 20 is a source (e.g., a spooled container) for wire 28, which is desirably retained at a remote location from build chamber 12. Wire 28 is a wire strand of a modeling material for building 3D object 24, where the modeling material includes an amorphous metallic alloy. As used herein, the term "amorphous metallic alloy" refers to a metallic alloy having an atomic-scale structure that is substantially non-crystalline (or fully non-crystalline), thereby allowing the alloy to exhibit a glass transition temperature between a solidification temperature and a melting temperature. Suitable amorphous metallic alloys may be formed from liquid-state cooling processes (i.e., metallic glasses), vapor deposition processes, chemical syntheses, and combinations thereof.

The amorphous metallic alloy desirably has a glass transition temperature that allows the modeling material of wire 24 to be heated to an extrudable state for extrusion from extrusion head 18 into build chamber 12. Suitable glass transition temperatures for the amorphous metallic alloy include temperatures of less than about 450° C., with particularly suitable glass transition temperatures including temperatures of less than about 250° C., and with even more particularly suitable glass transition temperatures including temperatures of less than about 150° C. All temperatures referred to herein are based on atmospheric-pressure conditions. At or below the glass transition temperature, the amorphous metallic alloy exhibits a viscosity that allows the modeling material to substantially retain its shape when deposited, and that also desirably reduces the risk of clogging the nozzle of extrusion head 18 (not shown in FIG. 1). In contrast, non-eutectic, polycrystalline metallic alloys exhibit slush states between the solidus and liquidus states, which are typically mixtures of low-viscosity liquids and randomly-shaped solid particles. Such alloys generally do not retain their shapes when deposited, and the solid particles dispersed through the low-viscosity liquid present a risk for clogging the nozzle of extrusion head 18. Furthermore, eutectic polycrystalline metals are generally unsuitable for extrusion due to the rapid phase changes between solidus and liquidus states.

Examples of suitable temperature differences between the glass transition temperature and the melting temperature of the amorphous metallic alloy include differences of at least about 20° C., with particularly suitable temperature differences including differences of at least about 50° C., and with even more particularly suitable temperature differences including differences of at least about 75° C. These differences between the glass transition temperature and the melting temperature allow the modeling material to be heated to an extrudable state without completely liquefying the material.

The amorphous metallic alloy also desirably has good physical properties to provide strong and durable 3D objects (e.g., 3D object 24). Examples of suitable values of the Young's Modulus for the amorphous metallic alloy include at least about 20,000 megapascals (about $2.9 \times 10^6$ pounds/square-inch), with particularly suitable values including at least about 30,000 megapascals (about $4.3 \times 10^6$ pounds/square-inch), where the values of the Young's Modulus are measured pursuant to ASTM E111-04 at 25° C. Examples of suitable tensile strengths for the amorphous metallic alloy include strengths of at least about 200 megapascals (about 29,000 pounds/square-inch), with particularly suitable tensile strengths including strengths of at least about 400 megapascals (about 58,000 pounds/square-inch), where the tensile strengths are measured pursuant to ASTM E8-04 at 25° C. The amorphous metallic alloy is also desirably corrosion and oxidation resistant to reduce the risk of degrading the alloy during a build operation, and to preserve the physical integrity and durability of 3D object 24.

In one embodiment, the amorphous metallic alloy includes an amorphous alloy of cerium, copper, aluminum, and niobium. For example, the amorphous metallic alloy may include an amorphous alloy of $Ce_{68}Cu_{20}Al_{10}Nb_2$, which exhibits a glass transition temperature of about 70° C., a melting temperature of about 150° C., and shows superplasticity at about 100° C. The material may be formed by arc melting cerium with copper, aluminum, and niobium in an inert atmosphere, and formed into solid ingots of the amorphous metallic alloy using a metglass cooling process. The solid ingots may then be reheated and shaped into the dimensions of wire 28.

In addition to the amorphous metallic alloy, the modeling material of wire 24 may also include additional materials, such as rheology modifiers, fillers, colorants, stabilizers, and combinations thereof. The dimensions of wire 28 may vary depending on the amorphous metallic alloy of wire 28, and on the dimensions of the components of extrusion head 18. Examples of suitable average diameters for wire 28 range from about 0.508 millimeters (about 0.020 inches) to about 2.54 millimeters (about 0.100 inches).

Filament supply source 22 is a source (e.g., a spooled container) for filament 30, and is also desirably retained at a remote location from build chamber 12. Filament 30 is a filament strand of a support material for building support structure 28. The dimensions of filament 30 may vary depending on the material of filament 30, and on the dimensions of the components of extrusion head 18. Examples of suitable average diameters for filament 30 range from about 1.143 millimeters (about 0.045 inches) to about 2.54 millimeters (about 0.100 inches). Suitable assemblies for wire supply source 20 and suitable filament strands for filament 30 are disclosed in Swanson et al., U.S. Pat. No. 6,923,634 and Comb et al., U.S. Pat. No. 7,122,246. In one embodiment, the support material of filament 30 may also include additional materials to increase layer-wise adhesion, such as one or more fluxing materials.

Build chamber 12 is desirably heated to, and maintained at, one or more temperatures that are in a window between the solidification temperatures and the creep relaxation temperatures of the modeling material and the support material. Examples of techniques for determining the creep relaxation temperatures of the modeling and support materials are disclosed in Batchelder et al., U.S. Pat. No. 5,866,058. This reduces the risk of mechanically distorting (e.g., curling) 3D object 24 and/or support structure 26. Accordingly, as used herein, the term "creep relaxation temperature" of a material refers to a temperature at which the stress relaxation modulus of the material is 10% relative to the stress relaxation modulus of the material at the solidification temperature of the material, where the stress relaxation modulus is measured pursuant to ASTM E328-02.

The modeling material of wire 28 (containing the amorphous metallic alloy) and the support material of filament 30 desirably have similar creep relaxation temperatures, thereby allowing build chamber 12 to be heated to a suitable temperature within the above-discussed window. Examples of suitable creep relaxation temperature differences for the modeling material of wire 28 and the support material of filament 30 include differences of less than about 30° C., with particularly suitable creep relaxation temperature differences including differences of less than about 20° C., and even more particularly suitable creep relaxation temperature differences including differences of less than about 10° C.

Furthermore, examples of suitable elevated temperature for build chamber 12, based on an average creep relaxation temperature between the creep relaxation temperatures of the modeling material and the support material, include temperatures within about 20° C. of the average creep relaxation temperature, with particularly suitable elevated temperature including temperatures within about 15° C. of the average creep relaxation temperature, and even more particularly suitable elevated temperature including temperatures within about 10° C. of the average creep relaxation temperature.

During a build operation with system 10, gantry 16 moves extrusion head 18 around in the horizontal x-y plane within build chamber 12, and successive portions of wire 28 are fed from wire supply source 20 to extrusion head 18. The received portions of wire 28 are heated to an extrudable state within extrusion head 18, and the upstream, unmelted portions of wire 28 function as a piston with a viscosity-pump action to extrude the heated modeling material out of extrusion head 18. The extruded modeling material then deposits onto build platform 14 based on a first predetermined pattern, thereby building 3D object 24 in a layer-by-layer manner. Correspondingly, successive portions of filament 30 may be fed from filament supply source 22 to extrusion head 18. The received portions of filament 30 are then heated to an extrudable state within extrusion head 18, and the upstream, unmelted portions of filament 30 function as a piston with a viscosity-pump action to extrude the support material out of extrusion head 18. Correspondingly, the extruded support material deposits onto build platform 14 based on a second predetermined pattern, thereby building support structure 26 in a layer-by-layer manner. This allows support structure 26 to provide underlying support to subsequently deposited layers of the amorphous metallic alloy of wire 28.

Figure 2:
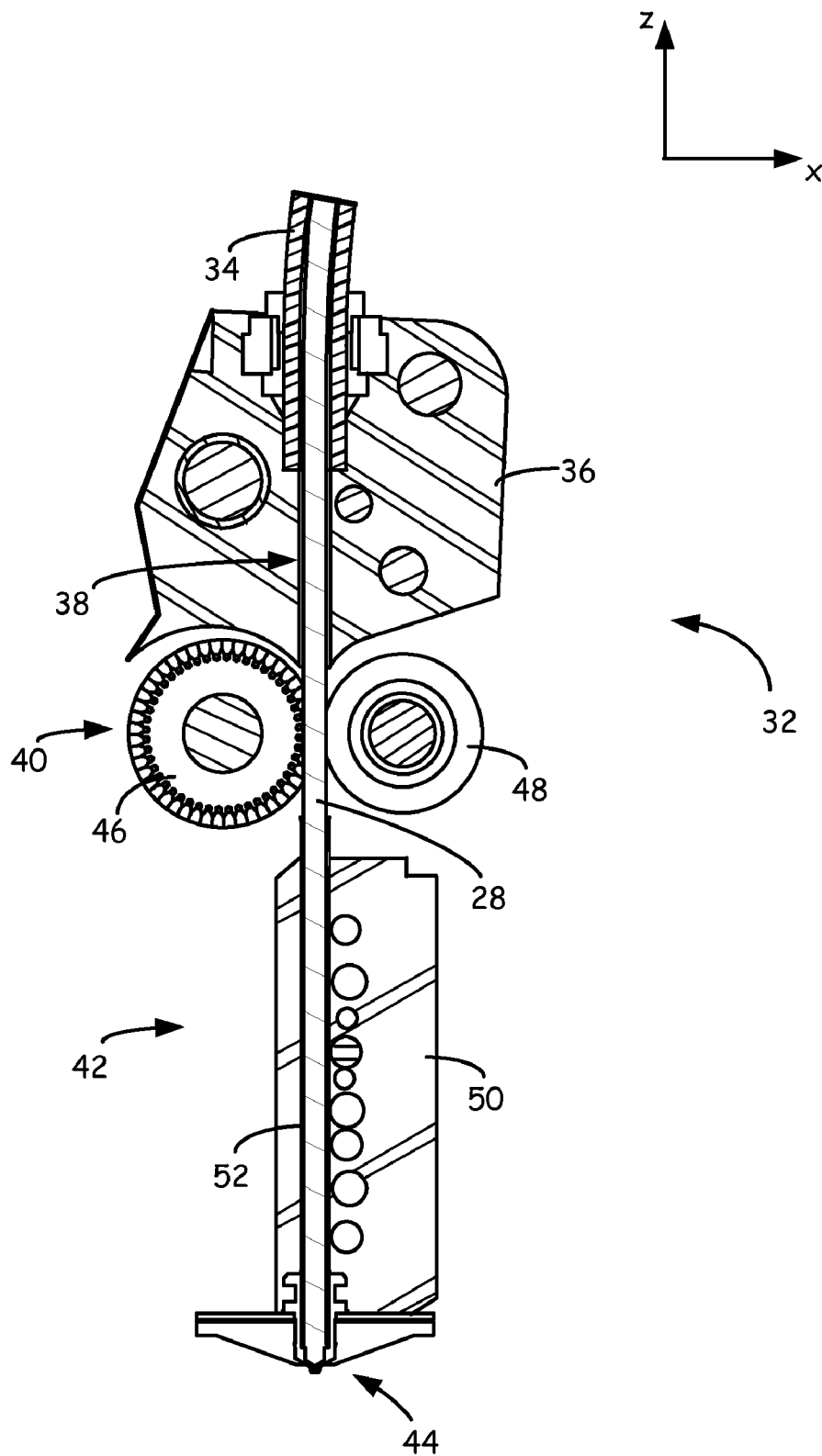
FIG. 2 is an expanded partial sectional view of a build line of an extrusion head for extruding an amorphous metallic alloy.

FIG. 2 is an expanded partial sectional view of build line 32 of extrusion head 18 (shown in FIG. 1) for extruding the modeling material of wire 28 (containing the amorphous metallic alloy) to build 3D object 24 (shown in FIG. 1). Build line 32 includes feed tube 34, base block 36, feed channel 38, drive system 40, liquefier assembly 42, and build tip 44, which are arranged in the same manner as disclosed in LaBossiere, et al., U.S. Patent Application Publication No. 2007/0228590. Feed tube 34 receives wire 28 from wire supply source 20, as discussed above. Wire 28 extends through feed tube 34 and feed channel 38 of base block 36, thereby allowing drive system 40 to feed wire 28 into liquefier assembly 42.

Drive system 40 includes drive roller 46 and idler roller 48, which are configured to engage and grip wire 28. Drive roller 46 is desirably connected to a drive motor (not shown), which allows drive roller 46 and idler roller 48 to feed the filament into liquefier assembly 42. Liquefier assembly 42 includes liquefier block 50 and liquefier tube 52. Liquefier tube 52 is a thin-wall, thermally conductive tube extending through liquefier block 50, which has an entrance adjacent drive system 40, and an exit at build tip 44. Cooling air is desirably supplied adjacent to the entrance of liquefier tube 52 to keep the temperature of wire 28 below the glass transition temperature of the modeling material at the locations upstream of liquefier assembly 42. Liquefier tube 52 provides a pathway for wire 28 to travel through liquefier block 50, and desirably includes an inner-surface coating (e.g., a dielectric coating) to reduce the risk of alloying the material of liquefier tube 52 and the amorphous metallic alloy of the modeling material.

Liquefier block 50 is a heating block for melting the filament to a desired flow pattern based on a thermal profile along liquefier block 50. Due to the high thermal conductivity of the amorphous metallic alloy of the modeling material (relative to thermoplastic materials), the length of thermal profile along liquefier block 50 may be reduced, which correspondingly reduces the flow response time during the build operation. Build tip 44 is an extrusion tip secured to liquefier assembly 42. Build tip 44 has a tip diameter for depositing roads of the modeling material, where the road widths and heights are based in part on the tip diameter. Examples of suitable tip diameters for build tip 44 range from about 250 micrometers (about 10 mils) to about 510 micrometers (about 20 mils).

The modeling material is extruded through build line 32 of extrusion head 18 by applying rotational power to drive roller 46 (from the drive motor). The frictional grip of drive roller 46 and idler roller 48 translates the rotational power to a drive pressure that is applied to wire 28. The drive pressure forces successive portions of wire 28 into liquefier tube 52, where the modeling material is heated by liquefier block 50 to an extrudable state. The unmelted portion of wire 28 functions as a piston with a viscosity-pump action to extrude the heated modeling material through liquefier tube 52 and build tip 44, thereby extruding the heated modeling material. The drive pressure required to force wire 28 into liquefier tube 52 and extrude the amorphous metallic alloy is based on multiple factors, such as the resistance to flow of the amorphous metallic alloy, bearing friction of drive roller 46, the grip friction between drive roller 46 and idler roller 48, and other factors, all of which resist the drive pressure applied to wire 28 by drive roller 46 and idler roller 48.

As discussed above, the modeling material is deposited in a predetermined pattern to build 3D object 24 in a layer-by-layer manner. The temperature of build chamber 12 (shown in FIG. 1) desirably allows the deposited modeling material to cool to below the glass transition temperature of the modeling material, thereby allowing the deposited modeling material to retain its shape and support subsequently deposited layers. Moreover, the elevated temperature of build chamber 12 reduces the risk of mechanically distorting the deposited modeling material as it cools in build chamber 12, despite the high thermal conductivity of the amorphous metallic material. As such, 3D object 24 may be built with a modeling material containing an amorphous metallic material, which exhibits good physical properties, while also substantially retaining the same desired deposition patterns that are attainable with deposited thermoplastic materials.

While extrusion head 18 is discussed above for a deposition process with a liquefier assembly, the build line 32 may be replaced with a variety of different feedstock drive mechanism and liquefier arrangements. For example, system 10 may include one or more two-stage pump assemblies, such as those disclosed in Batchelder et al., U.S. Pat. No. 5,764,521; and Skubic et al., U.S. Patent Application Publication No. 2008/0213419. In an additional alternative embodiment involving two-stage pump assemblies, the liquefier portion may be located at the first stage, and the heated build material is then conveyed to a moveable deposition head. Although the present invention has been described with reference to preferred embodiments, workers skilled in the art will recognize that changes may be made in form and detail without departing from the spirit and scope of the invention.

The invention claimed is:

1. A method for building a three-dimensional object in a layer-by-layer manner with an extrusion-based digital manufacturing system having a build chamber, the method comprising:
    providing a supply source to the extrusion-based digital manufacturing system at a remote location from the build chamber, the supply source comprising a modeling material, wherein the modeling material comprises an amorphous metallic alloy having a melting temperature, a glass transition temperature less than about 450° C., a creep relaxation temperature, and a solidification temperature, wherein the difference between the glass transition temperature and the melting temperature is at least about 20° C., and wherein the modeling material has a wire geometry formed from a reheated and shaped solid material of the amorphous metallic alloy;
    heating the build chamber of the extrusion-based digital manufacturing system to one or more temperatures within a window ranging from the solidification temperature and the creep relaxation temperature of the modeling material;
    feeding the modeling material from the supply source disposed at the remote location from the build chamber, through a portion of the extrusion-based digital manufacturing system, and to a liquefier assembly retained by the extrusion-based digital manufacturing system;
    heating the modeling material of the solid feedstock in the liquefier assembly to an extrudable state; and
    depositing the heated modeling material within the heated build chamber in a predetermined pattern to form the three-dimensional object.

2. The method of claim 1, wherein the liquefier assembly comprises a liquefier tube and a coating on an inner surface of the liquefier tube that is configured to reduce alloying of the amorphous metallic alloy of the modeling material to the inner surface of the liquefier tube.

3. The method of claim 1, wherein the glass transition temperature of the amorphous metallic alloy is less than about 250° C.

4. The method of claim 1, wherein the difference between the glass transition temperature and the melting temperature of the modeling material is at least about 50° C.

5. The method of claim 1, wherein the amorphous metallic alloy comprises cerium, copper, aluminum, and niobium.

6. The method of claim 1, wherein the amorphous metallic alloy comprises an alloy having a chemical formula of $Ce_{68}Cu_{20}Al_{10}Nb_2$.

7. The method of claim 1, wherein the wire geometry has an average diameter ranging from about 0.508 millimeters to about 2.54 millimeters.

8. A method for building a three-dimensional object in a layer-by-layer manner with an extrusion-based digital manufacturing system having a build chamber, the method comprising:
    providing a first container to the extrusion-based digital manufacturing system at a remote location from the build chamber, wherein the first container has a modeling material that comprises an amorphous metallic alloy and has a melting temperature, a glass transition temperature less than about 450° C., a creep relaxation temperature, and a solidification temperature, wherein the difference between the glass transition temperature and the melting temperature is at least about 20° C. and wherein the modeling material has a wire geometry formed from a reheated and shaped solid material of the amorphous metallic alloy;
    providing a second container to the extrusion-based digital manufacturing system, wherein the second container has a filament of support material that comprises a thermoplastic material and has a creep relaxation temperature and a solidification temperature, and wherein a difference between the creep relaxation temperatures of the modeling material and the support material is less than about 30° C.;
    heating the build chamber of the extrusion-based digital manufacturing system to one or more temperatures within a window ranging from the solidification temperature and the creep relaxation temperature of the modeling material;
    feeding the modeling material from the first container disposed at the remote location from the build chamber, through a portion of the extrusion-based digital manufacturing system, and to an extrusion head retained by the extrusion-based digital manufacturing system;
    plastic-metal extruding the modeling material from the extrusion head in a first predetermined pattern within the heated build chamber to form the three-dimensional object;
    feeding the support material from the second container to the extrusion head; and
    thermoplastic extruding the support material from the extrusion head in a second predetermined pattern within the heated build chamber to form a support structure for the three-dimensional object.

9. The method of claim 8, wherein the support material further comprises a fluxing material.

10. The method of claim 8, wherein the difference between the creep relaxation temperatures of the modeling material and the support material is less than about 20° C.

11. The method of claim 8, wherein the wire geometry of the modeling material has an average diameter ranging from about 0.508 millimeters to about 2.54 millimeters.

12. The method of claim 11, wherein the filament of the support material has an average diameter ranging from about 1.143 millimeters to about 2.54 millimeters.

13. The method of claim 8, wherein the amorphous metallic alloy comprises cerium, copper, aluminum, and niobium.

14. The method of claim 8, wherein the amorphous metallic alloy comprises an alloy having a chemical formula of $Ce_{68}Cu_{20}Al_{10}Nb_2$.

* * * * *